(12) United States Patent
Aschenbruck et al.

(10) Patent No.: US 6,171,052 B1
(45) Date of Patent: Jan. 9, 2001

(54) COOLING OF A HONEYCOMB SEAL IN THE PART OF A GAS TURBINE TO WHICH HOT GAS IS ADMITTED

(75) Inventors: Emil Aschenbruck, Duisburg; Markus Beukenberg, Homburg, both of (DE)

(73) Assignee: GHH BORSIG Turbomaschinen GmbH (DE)

( * ) Notice: Under 35 U.S.C. 154(b), the term of this patent shall be extended for 0 days.

(21) Appl. No.: 09/293,739

(22) Filed: Apr. 16, 1999

(30) Foreign Application Priority Data

May 13, 1998 (DE) .............................................. 198 21 365

(51) Int. Cl.$^7$ ....................................................... F02C 7/18
(52) U.S. Cl. ......................................... 415/173.1; 415/175
(58) Field of Search .............................. 415/173.1, 173.3, 415/173.4, 173.5, 175

(56) References Cited

U.S. PATENT DOCUMENTS

| | | |
|---|---|---|
| 3,365,172 | 1/1968 | McDonough et al. ............. 415/173.4 |
| 3,603,599 * | 9/1971 | Tomita et al. ................. 415/173.5 X |
| 4,662,821 * | 5/1987 | Karvistin et al. .................. 415/174.5 |
| 5,215,435 | 6/1993 | Webb et al. . |
| 5,749,701 * | 5/1998 | Clarke et al. .......................... 415/115 |
| 5,967,745 * | 10/1999 | Tomita et al. ..................... 415/173.7 |

FOREIGN PATENT DOCUMENTS 196 19 438
A1   11/1997   (DE) .

* cited by examiner

Primary Examiner—John E. Ryznic
(74) Attorney, Agent, or Firm—McGlew and Tuttle, P.C.

(57) ABSTRACT

The present invention pertains to the cooling of a honeycomb seal (2), which is arranged in a carrier ring (4), with vertical (2.2) and horizontal (2.1) honeycomb openings.

To achieve this, the support ring (4) of the honeycomb seal (2) is provided with cooling air grooves (5) and tangentially arranged cooling holes (6), so that the cooling air (7) is fed homogeneously from the outer annular chamber (8) to the honeycomb seal (2) and can escape via the open honeycomb structure (2.2). Intense cooling action of the honeycomb seal (2), which is subject to high thermal stress, is generated as a result. Furthermore, corrosive process gas is kept extensively away from the honeycomb seal (2).

At the same time, the sealing effect of the rotor blade labyrinth seal is improved by the cooling air flow (7) and the rotor blade leak flow (11) crossing each other or being directed in opposite directions.

6 Claims, 3 Drawing Sheets

COOLING OF A HONEYCOMB SEAL IN THE PART OF A GAS TURBINE TO WHICH HOT GAS IS ADMITTED

FIELD OF THE INVENTION

The present invention pertains to the cooling of a honeycomb seal with vertical and horizontal honeycomb openings, which is arranged in a carrier ring of a gas turbine.

BACKGROUND OF THE INVENTION

Sealing points between the housing and the rotor are designed as labyrinth seals in axial rotary machines and turbocompressors used for hot gas operation.

To increase the sealing action, so-called honeycomb seals are used as opposing running surfaces of the sealing tips of the rotor blade in the first turbine stage after the entry of the compressed hot gases from the bifurcated pipe.

For hot gas operation of the turbine, these honeycomb seals are made of high temperature-resistant Ni-base alloys. In the case of a further increase in the operating temperature, the temperature of the material of the honeycomb seal was reduced hitherto by a housing wall cooling or external film cooling to a limited extent only in a gas turbine developed by the applicant.

Due to the generally insufficient cooling of the seal, sealing tips, rotor blade and other components in the first turbine stage of the gas turbine, excessively high material temperatures were observed on the welded parts, which adversely affected the oxidation and corrosion resistance and led to unacceptable sealing losses.

SUMMARY AND OBJECTS OF THE INVENTION

The primary object of the present invention is to increase the temperature and corrosion resistance of the honeycomb seals used and to achieve a reduction in leaks at the seals.

According to the invention, a cooling of a honeycomb seal with vertical and horizontal honeycomb openings is provided which is arranged in a carrier ring of a gas turbine. Tangentially arranged cooling air holes with cooling air grooves are milled into the carrier ring on the outside of the honeycomb seal. Cooling air is guided either through vertical honeycomb openings or through horizontal honeycomb openings.

According to another aspect of the invention, a cooling of a honeycomb seal with vertical and horizontal honeycomb openings is provided which is arranged in a carrier ring of a gas turbine. Tangentially arranged cooling air holes with cooling air grooves are milled into the carrier ring on the outside of the honeycomb seal. Cooling air is guided simultaneously through the vertical and horizontal honeycomb openings.

A heat-insulating coating may be applied to the carrier ring on the process gas side.

Cooling air is guided specifically through the honeycomb structure of the honeycomb seal, so that the temperature of the seal material is reduced and the cooling air flow generates an additional barrier effect in the sealing system.

According to the present invention, the honeycomb seal of a gas turbine rotor blade stage, which honeycomb seal is arranged in the housing, is cooled internally. To achieve this, the carrier ring of the honeycomb seal is provided with cooling air grooves and tangentially arranged cooling holes, so that the cooling air is fed homogeneously from the outer annular chamber to the honeycomb seal and it can escape via the open honeycomb structure. As a result, intense cooling effect of the material of the honeycomb seal, which can be subjected to high thermal stress, is generated. Furthermore, corrosive, hot process gas of the first turbine stage is kept extensively away from the seal.

Due to the corresponding arrangement of the honeycomb seal in the vertical and horizontal direction, an additional sealing effect of the rotor blade labyrinth seal is achieved at the same time by the cooling air flow and the rotor blade leak flow crossing each other or being directed in opposite directions. To lower the temperature of the carrier ring and to reduce the heating of the cooling air, the carrier ring is coated with a heat-insulating layer on the process gas side.

The present invention can also be used in all cases in which the temperature is to be reduced and/or the sealing ability of labyrinth seals with honeycomb type opposite running surfaces is to be improved and is not limited to certain rotary machines.

Due to the controlled cooling of the honeycomb seal, the material temperature is reduced, in general, along with an improvement in the oxidation and corrosion resistance as well as a considerable reduction in the sealing losses in the first compressor stage of the hot gas turbine. On the whole, the long-term power characteristic of gas turbines and turbomachines is improved.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF FIG. 1

Figure 1:
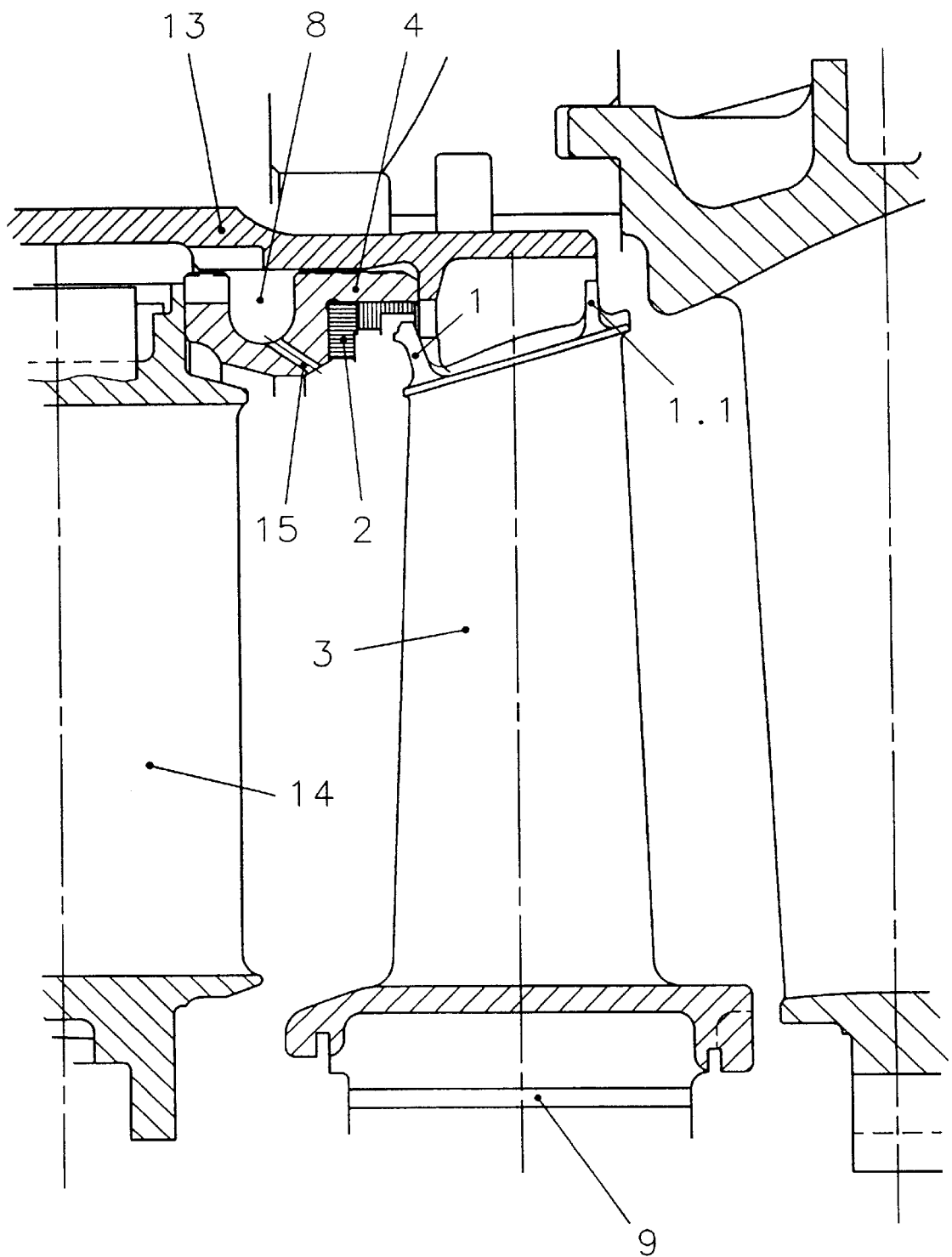
FIG. 1 is a sectional view taken through the first turbine stage of a gas generator according to the state of the art.

Referring to the drawings in particular, FIG. 1 shows the arrangement of a honeycomb seal 2 in the carrier ring 4 of the input stage of a gas turbine on the inside of the housing wall 13.

The hot and compressed process gas flows from the bifurcated pipe arranged between the combustion chamber and the turbine through the guide vane cascade 14 and meets the turbine rotor blade 3.

Due to the honeycomb seal 2 being arranged in the area of the sealing tips 1, 1.1 of the rotor blade 3, an additional sealing effect of the rotor blade labyrinth seal is brought about. Cooling air is fed into this area from the annular chamber 8 only over holes 15 in the carrier ring 4, which are distributed over the circumference.

DESCRIPTION OF THE PREFERRED EMBODIMENT

Figure 2:
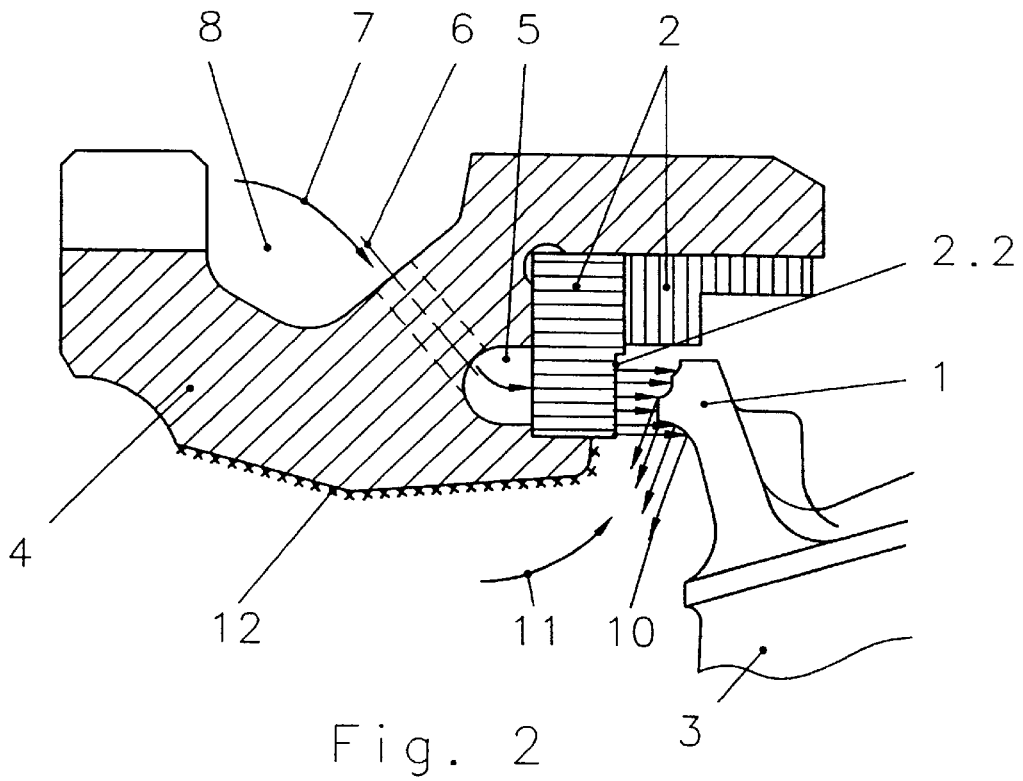
FIG. 2 is a sectional view taken in the area of the carrier ring according to the invention with horizontal cooling air feed.
Figure 3:
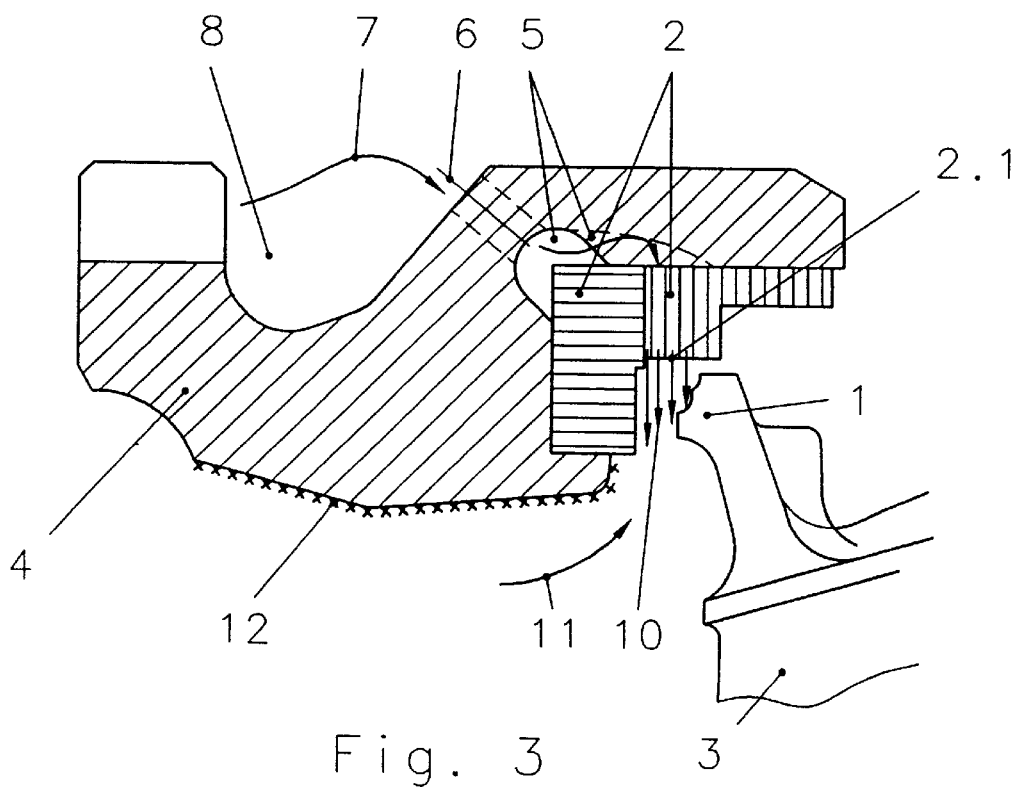
FIG. 3 is a sectional view taken in the area of the carrier ring according to the invention with vertical cooling air feed.

According to FIGS. 2 and 3, honeycomb seals 2 are used as opposite running surfaces of the sealing tips 1 to increase the sealing effect, and these seals 2 are provided with vertical holes 2.1 and horizontal holes 2.2.

According to the present invention, the honeycomb seal 2 of a gas turbine rotor blade stage 3, which is arranged in the housing 13, is cooled internally. To do so, a carrier ring 4 of the honeycomb seal 2 is provided with cooling air grooves 5 and tangentially arranged cooling holes 6, so that the cooling air 7 is fed homogeneously from the outer annular chamber 8 to the honeycomb seal 2 and it can escape via the open honeycomb structure 2.1, 2.2. The carrier ring 4 with the features according to the invention and with the seal 2 is used in an arrangement as shown in FIG. 1, and replaces the carrier ring of FIG. 1. Intense cooling of the honeycomb seal 2, which is subject to high thermal stress, is generated as a result. Furthermore, corrosive process gas is kept extensively away from the honeycomb seal 2.

FIG. 2 shows a section through the carrier ring 4, where the cooling air 7 is guided via a hole 6 with cooling air groove 5 into the horizontal holes 2.2 of the honeycomb seal 2.

FIG. 3 shows a section through the carrier ring 4 where the cooling air 7 is guided via a hole 6 with cooling air grooves 5 into the vertical holes 2.1 of the honeycomb seal 2.

Due to the corresponding arrangement of the honeycomb seal 2 with vertical 2.1 and horizontal 2.2 holes, an additional sealing effect of the rotor blade labyrinth seal is brought about at the same time at the sealing tips 1, 1.1 of the rotor blade 3 by the cooling air flow 10 and the rotor blade leak flow 11 crossing each other or being directed in opposite directions.

To lower the temperature of the carrier ring 4 and to reduce the heating of the cooling air, the carrier ring 4 has a heat-insulating coating 12 on the process gas side.

Figure 4:
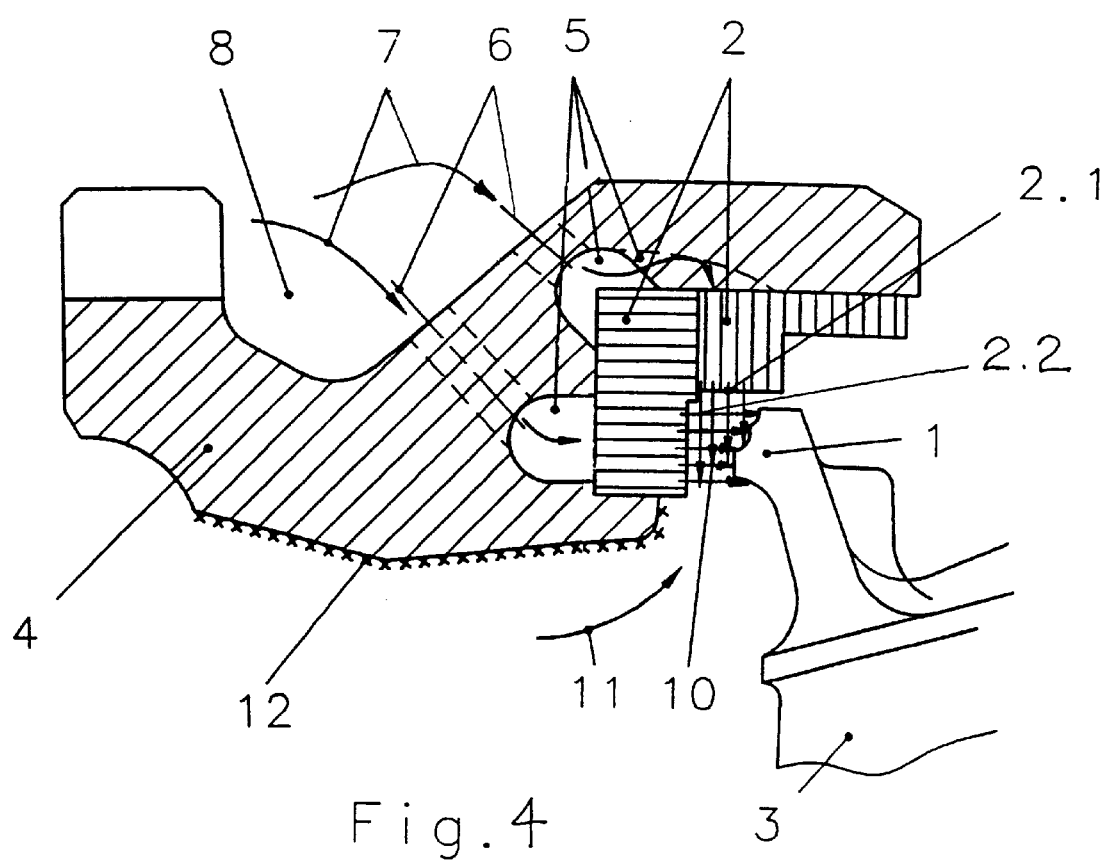
FIG. 4 is a sectional view taken in the area of the carrier ring according to the invention with horizontal and vertical cooling air feed.

FIG. 4 shows a section through the carrier ring 4 where the cooling air 7 is guided via a hole 6 with cooling air grooves 5 into the vertical holes 2.1 of the honeycomb seal 2 and the cooling air 7 is guided via another hole 6 with cooling air grooves 5 into the horizontal holes 2.2 of the honeycomb seal 2. As an alternative, the simultaneous guiding of the cooling air may take place with a hole 6 that splits to form two grooves 5, one leading to holes 2.1 and another leading to holes 2.2 or a common groove may be provided.

While specific embodiments of the invention has been shown and described in detail to illustrate the application of the principles of the invention, it will be understood that the invention may be embodied otherwise without departing from such principles.

List of Reference Numbers
1 Front sealing tip of 3
1.1 Rear sealing tip of 3
2 Honeycomb seal
2.1 Honeycomb seal with vertical holes
2.2 Honeycomb seal with horizontal holes
3 Rotor blade
4 Carrier ring
5 Cooling air groove
6 Hole in 4
7 Cooling air
8 Annular chamber
9 Rotor disk
10 Cooling air flow
11 Rotor blade leak flow
12 Coating
13 Housing wall of the turbine
14 Inlet opening, hot gas
15 Hole in 4

What is claimed is:

1. A cooled honeycomb seal for a part of a gas turbine to which hot gas is admitted, the seal comprising:

a carrier ring;

a honey comb part with vertical honeycomb openings arranged adjacent to said carrier ring of the gas turbine;

a honey comb part with horizontal honeycomb openings arranged adjacent to said carrier ring of a gas turbine, tangentially arranged cooling air holes with cooling air grooves being milled into said carrier ring on an outside of said honeycomb parts to define cooling air paths either through said vertical honeycomb openings or through the said horizontal honeycomb openings.

2. The cooling of a honeycomb seal in accordance with claim 1, wherein a said heat-insulating coating is applied to said carrier ring on the process gas side.

3. A cooled honeycomb seal for a part of a gas turbine to which hot gas is admitted, the seal comprising:

a carrier ring;

a honey comb part with vertical honeycomb openings arranged in said carrier ring of the gas turbine;

a honey comb part with horizontal honeycomb openings arranged in said carrier ring of a gas turbine, tangentially arranged cooling air holes with cooling air grooves being milled into said carrier ring on an outside of said honeycomb parts to define cooling air paths cooling air simultaneously through said vertical and said horizontal honeycomb openings.

4. The cooling of a honeycomb seal in accordance with claim 1, wherein a said heat-insulating coating is applied to said carrier ring on the process gas side.

5. A process for cooling a honeycomb seal for a part of a gas turbine to which hot gas is admitted, the process comprising the steps of:

providing a carrier ring;

providing a honey comb part with vertical honeycomb openings, and arranging it in said carrier ring of the gas turbine;

providing a honey comb part with horizontal honeycomb openings and arranging it in said carrier ring of a gas turbine;

milling tangentially arranged cooling air holes with cooling air grooves into said carrier ring on an outside of said honeycomb parts to define cooling air paths either through said vertical honeycomb openings or through the said horizontal honeycomb openings.

6. The process in accordance with claim 5, further comprising coating said carrier ring with a said heat-insulating coating on the process gas side.

\* \* \* \* \*